United States Patent
Bian et al.

(10) Patent No.: US 7,056,829 B2
(45) Date of Patent: Jun. 6, 2006

(54) POLISHING COMPOSITION FOR SEMICONDUCTOR WAFERS

(75) Inventors: Jinru Bian, Newark, DE (US); John Quanci, Haddonfield, NJ (US); Matthew R. VanHanehem, Bear, DE (US)

(73) Assignee: Rohm and Haas Electronic Materials CMP Holdings, Inc., Wilmington, DE (US)

( * ) Notice: Subject to any disclaimer, the term of this patent is extended or adjusted under 35 U.S.C. 154(b) by 0 days.

(21) Appl. No.: 11/199,639

(22) Filed: Aug. 9, 2005

(65) Prior Publication Data
US 2005/0282390 A1 Dec. 22, 2005

Related U.S. Application Data

(62) Division of application No. 10/664,722, filed on Sep. 17, 2003, now abandoned.

(51) Int. Cl.
*H01L 21/302* (2006.01)
*C09K 13/00* (2006.01)

(52) U.S. Cl. .................................. 438/692; 438/693
(58) Field of Classification Search ............... 438/692, 438/693; 252/79.1; 51/307
See application file for complete search history.

(56) References Cited

U.S. PATENT DOCUMENTS

2003/0102457 A1* 6/2003 Miller ..................... 252/79.1

* cited by examiner

*Primary Examiner*—Douglas W Owens
(74) *Attorney, Agent, or Firm*—Blake T. Biederman

(57) ABSTRACT

An aqueous composition is useful for polishing semiconductor wafers. The composition comprises a nonionic surfactant that suppresses removal rate of silicon carbide-nitride and has a hydrophilic group and a hydrophobic group. The hydrophobic group has a carbon chain length of greater than three. And the nonionic surfactant suppresses silicon carbide-nitride removal rate at least 100 angstroms per minute greater than its decrease in silicon nitride removal rate as measured with a microporous polyurethane polishing pad pressure measured normal to a wafer of 13.8 kPa.

10 Claims, No Drawings

US 7,056,829 B2

POLISHING COMPOSITION FOR SEMICONDUCTOR WAFERS

This application is a division of U.S. Ser. No. 10/664,722 filed Sep. 17, 2003 now abandoned.

BACKGROUND OF THE INVENTION

This invention relates to polishing of semiconductor wafers and, more particularly, to compositions and methods for removing wafer layers, such as, barrier materials, capping materials, dielectric layers, anti-reflective layers and hard masks in the presence of an underlying silicon carbide nitride layer.

Typically, semiconductor substrates have a silicon base and dielectric layers containing multiple trenches arranged to form a pattern of circuit interconnects within the dielectric layer. These trench patterns have either a damascene structure or dual damascene structure. In addition, typically one to as many as three or more capping layers coat the trench patterned dielectric layer with a barrier layer covering the capping layer or capping layers. Finally, a metal layer covers the barrier layer and fills the patterned trenches. The metal layer forms circuit interconnects that connect dielectric regions and form an integrated circuit.

The capping layers can serve different purposes. For example, a capping layer, such as, silicon carbide nitride coating dielectrics, may act as a polishing stop to protect underlying dielectrics from removal during polishing. The silicon carbide nitride's nitrogen concentration varies with manufacturer; and it may contain up to approximately 50 atomic percent nitrogen-if the nitride content is zero, then the stopping layer has a chemistry of silicon carbide. In addition, a silicon dioxide layer, silicon nitride layer or a combination of the two layers, may correct topography above the stopping layer. Typically, a barrier layer, such as a tantalum barrier layer, coats the capping layer and a metal conductive layer covers the barrier layer to form the interconnect metal.

Chemical mechanical planarization or CMP processes often include multiple polishing steps. For example, an initial planarization step removes a metal layer from underlying barrier dielectric layers to planarize the wafer. This first-step polishing removes the metal layer, while leaving a smooth planar surface on the wafer with metal-filled trenches that provide circuit interconnects planar to the polished surface. First-step polishing steps tend to remove excess interconnect metals, such as copper at a relatively high rate. After the first-step polishing, a second-step polishing process typically removes a barrier that remains on the semiconductor wafer. This second-step polishing removes the barrier from its underlying dielectric layer to provide a planar polished surface on the dielectric layer. The second-step polishing may stop on a capping layer, remove all capping layers or remove some of the underlying dielectric layer.

Unfortunately, CMP processes often result in the excess removal of unwanted metal from circuit interconnects or "dishing". This dishing can result from, both first-step polishing and second-step polishing. Dishing in excess of acceptable levels causes dimensional losses in the circuit interconnects. These thin areas in the circuit interconnects attenuate electrical signals and can impair continued fabrication of dual damascene structures. In addition to dishing, the CMP processes often remove excessive amounts of the dielectric layer in an effect known as "erosion". Erosion that occurs adjacent to the interconnect metal can introduce dimensional defects in the circuit interconnects. In a manner similar to dishing, these defects contribute to attenuation of electrical signals and impair subsequent fabrication of dual damascene structures.

After removing the barrier layer and any undesired capping layers, a first capping layer stop, such as a silicon carbide nitride stopping layer, often prevents the CMP process from damaging the dielectric. This stopping layer typically protects the underlying dielectrics to avoid or alleviate dielectric erosion by controlling removal rate. The removal rates of the barrier and other capping layers (such as, silicon nitride and silicon dioxide), versus, a removal rate of the stopping layer are examples of selectivity ratios. For purposes of this application, selectivity ratio refers to the ratio in removal rate as measured in angstroms per minute.

Minamihaba et al., in U.S. Pat. Pub. No. 2003/0124850, disclose a polishing slurry for removing silicon carbide series compounds, such as, SiCO, SiCH and SiCN. This polishing slurry teaches the use of either an amino acid having a benzene ring or an organic acid having a heterocycle to facilitate removal of the silicon carbide series compounds. Unlike this process that removes silicon carbide series layers, some integration schemes that have silicon carbide nitride stop layers require polishing without removing the protective cap.

There is an unsatisfied demand for a composition that selectively removes barrier materials and capping materials (such as, silicon nitride and silicon dioxide) without removing excessive amounts of silicon carbide nitride stopping layers. In addition, there is a need for a slurry that polishes semiconductor wafers as follows: 1) removes barrier or capping materials; 2) reduces interconnect dishing, dielectric erosion and avoids peeling of the dielectric; and 3) operates with a silicon carbide-nitride stopping layer.

STATEMENT OF THE INVENTION

The invention provides an aqueous composition useful for polishing semiconductor wafers, comprising a nonionic surfactant that suppresses removal rate of silicon carbide-nitride, the nonionic surfactant having a hydrophilic group and a hydrophobic group, the hydrophobic group having a carbon chain length of greater than three and the nonionic surfactant suppresses silicon carbide-nitride removal rate at least 100 angstroms per minute greater than its decrease in silicon nitride removal rate as measured with a microporous polyurethane polishing pad pressure measured normal to a wafer of 13.8 kPa.

An additional aspect of the invention provides an aqueous composition useful for polishing semiconductor wafers, comprising by weight percent, 0 to 30 abrasive, 0 to 15 inhibitor for a nonferrous metal, 0 to 25 oxidizer, 0 to 10 tantalum removal agent selected from the group comprising formamidine, formamidine salts, formamidine derivatives, guanidine derivatives, guanidine salts and mixtures thereof and 0.001 to 5 nonionic surfactant that suppresses removal rate of silicon carbide-nitride and has a hydrophilic group and a hydrophobic group, the hydrophobic group having a carbon chain length of greater than three and the nonionic surfactant suppresses silicon carbide-nitride removal rate at least 100 angstroms per minute greater than its decrease in silicon nitride removal rate as measured with a microporous polyurethane polishing pad pressure measured normal to a wafer of 13.8 kPa and the nonionic surfactant is selected from the group comprising alkanoamide, alkyl polyethylene oxide, alkylphenol polyethylene oxide, polyoxyethylenated alkyl amine oxide, polyoxyethylenated polyoxypropylene glycols, alkyl polyglucoside, alkyl carboxylic acid esters, polyoxyethylenated mercaptans, alkyl diglyceride, polyoxyethylenated alkanolamine, polyalkoxylated amides, tertiary acetylenic glycols and a mixture thereof.

An additional aspect of the invention provides a polishing method for removing at least one coating layer from a semiconductor substrate comprising: contacting the semiconductor substrate with a polishing composition, the semiconductor substrate having a silicon carbide-nitride below the at least one coating layer, the polishing composition containing a nonionic surfactant to suppress removal of the silicon carbide-nitride and the nonionic surfactant having a hydrophilic group and a hydrophobic group, the hydrophobic group having a carbon chain length of greater than three; polishing the semiconductor substrate with a polishing pad to remove the at least one coating layer at a removal rate greater than a removal rate for the silicon carbide-nitride layer as expressed in angstroms per minute; and stopping the polishing before removing all of the silicon carbide-nitride layer.

DETAILED DESCRIPTION

The slurry and method provide unexpected selectivity for removing barrier materials or capping materials, such as silicon nitride and silicon oxide, while stopping at silicon carbide nitride layers. The slurry relies upon nonionic surfactants to selectively remove at least one layer, such as, tantalum-containing or silicon nitride layers while stopping at a silicon carbide nitride layer. This selectivity reduces dishing of interconnect metal and erosion of dielectric layers. Furthermore, the slurry can remove barrier materials and capping layers such as, silicon nitride, organic caps and dielectrics while stopping at silicon carbide nitride layers without peeling or delaminating fragile low-k dielectric layers from semiconductor wafers. Another benefit of these slurries is the composition's ability to stop at silicon carbon doped oxide (CDO) layers.

A surface active agent or surfactant, as used in this specification refers to a substance that, when present, has the property of adsorbing onto the wafer substrate's surface or interfaces or alters the surface free energy of the wafer substrate's surface or interfaces. The term "interface" is a boundary between any two immiscible phases. The term "surface" denotes an interface where one phase is gas, usually air. Surfactants usually act to reduce interfacial free energy.

The nonionic surfactants have a characteristic molecular structure consisting of a structural group that has very little attraction for water known as a hydrophobic group, together with a group that has a strong attraction for water, called a hydrophilic group. The nonionic surfactant bears no apparent ionic charge, but it typically has a hydrophilic group that contains oxygen, sulfur or nitrogen atoms. The hydrophobic groups usually are long chain hydrocarbons, fluorocarbons or siloxane chains that have a length suitable for aqueous solubility. In particular, the hydrophobic groups have a carbon chain length of greater than three. Most advantageously, the hydrophobic group has a carbon chain length of at least six.

The nonionic surfactants typically have different hydrophilic and hydrophobic characteristics. For example, an HLB value (Hydrophile-Lipophile Balance) defines the extent of the hydrophilicity and hydrophobicity of a surfactant. A larger HLB value for a surfactant indicates that the surfactant is more hydrophilic than a surfactant with a small HLB value. The definition and calculation of HLB for surfactants can be found in many monographic books, such as the one authored by Milton J. Rosen, "Surfactants and Interfacial Phenomena", published by Wiley Interscience (1979). The nonionic surfactant typically has an HLB of 2 to 30. Advantageously, the nonionic surfactant has an HLB of 2.5 to 25. Most advantageously, the nonionic surfactant has an HLB between 3 and 20; and in particular, nonionic surfactant values equal to and above 10 further reduce silicon carbide nitride removal rate.

The preferred nonionic surfactants are selected from the group comprising alkanoamide, alkyl polyethylene oxide, alkylphenol polyethylene oxide, polyoxyethylenated alkyl amine oxide, polyoxyethylenated polyoxypropylene glycols, alkyl polyglucoside, alkyl carboxylic acid esters, polyoxyethylenated mercaptans, alkyl diglyceride, polyoxyethylenated alkanolamine, polyalkoxylated amides, tertiary acetylenic glycols and a mixture thereof. The most preferred nonionic surfactants are selected from the group comprising alkanoamide, alkyl polyethylene oxide, alkylphenol polyethylene oxide and a mixture thereof. Some alkanomide-containing compositions may experience a viscosity increase after several days. If the composition experiences this viscosity increase, then it can be advantageous to add these surfactants at or near the point of use.

Advantageously, the nonionic surfactant is an alkanoamide and the alkanoamide is an acylation product of alkanolamines from the group comprising monoalkanolamine (MAA), dialkanolamine (DAA), trialkanolamine and a mixture thereof. Most advantageously, alkanolamine is selected from the group comprising diethanolamine, monoethanolamine, triethanolamine, diisopropanolamine, monoisopropanolamine, ethanoisopropanolamine and a mixture thereof. Particular effective nonionic surfactants for the high removal rate selectivity include cocamide diethanolamine (DEA), lauramide DEA, linoleamide DEA and ricinoleamide DEA-cocamide is an acylation product of DEA with coconut acid; laruamide is an acylation product of DEA with laurylic acid; linoleamide is acylation product of DEA with linoleic acid; and ricinoleamide is acylation product of DEA with ricinoleic acid. Additional effective nonionic surfactants include alkyl and alkylphenol polyethylene oxide.

Typically, the high selectivity can be achieved by addition of 0.001 to 5 wt % of the surfactant. This specification refers to all concentrations in weight percent, unless specifically referenced otherwise. Furthermore, the disclosed ranges include combining and partially combining ranges and limits within ranges. Advantageously, the surfactant is 0.01 to 1 wt %; and most advantageously surfactant is 0.03 to 0.3 wt %.

The nonionic surfactant suppresses removal rate of silicon carbide-nitride as measured in angstroms per minute in a greater differential rate than it suppresses silicon nitride. In particular, the nonionic surfactant suppresses silicon carbide-nitride removal rate at least 100 angstroms per minute greater than its decrease in silicon nitride removal rate as measured with a microporous polyurethane polishing pad pressure measured normal to a wafer of 13.8 kPa (2 psi) and the conditions of the Examples. For example, when polishing at a pressure of 13.8 kPa and the conditions of the Examples with an IC 1010™ polishing pad with a surfactant-free composition provides a control polishing rate of 500 angstroms per minute for silicon carbide nitride and 500 angstroms per minute for silicon nitride. Then adding the nonionic surfactant reduces the polishing rates under the same conditions to 300 angstroms per minute for silicon carbide nitride and 400 angstroms per minute silicon nitride to produce a 200 angstroms per minute and a 100 angstroms per minute decrease in removal rate respectively. This equals 100 angstroms per minute greater decrease in removal rate for silicon carbide nitride in relation to silicon nitride. Advantageously, the slurry provides at least 200 angstroms per minute greater decrease in removal rate for silicon carbide nitride in relation to silicon nitride. Most advantageously, the slurry provides at least a 500 angstroms per minute greater decrease in removal rate for silicon carbide nitride in relation to silicon nitride.

The slurry with the surfactant can be used in acidic, neutral and basic pH levels for the selectivity of TaN/SiCN, SiN/SiCN and TEOS/SiCN. Advantageously, the pH for the selectivity is a pH of at least 7; and most advantageously, the pH is 7 to 10.

Optionally, the composition may contain agents for the removal of barrier layers, such as, tantalum, tantalum nitride, tantalum-silicon nitride, titanium, titanium nitride, titanium-silicon nitride, titanium-titanium nitride, titanium-tungsten, tungsten, tungsten nitrides and tungsten-silicon nitride barriers Optionally, the composition includes 0 to 10 weight percent of a tantalum removal agent that further increases the removal rate of tantalum-containing materials or enhances the selectivity of tantalum nitride to silicon carbide nitride. The solution relies upon a tantalum barrier removal agent selected from the group comprising formamidine, formamidine salts, formamidine derivatives, such as guanidine, guanidine derivatives, guanidine salts and a mixture thereof to selectively remove tantalum barrier materials. Particular effective guanidine derivatives and salts include guanidine hydrochloride, guanidine sulfate, amino-guanidine hydrochloride, guanidine acetic acid, guanidine carbonate, guanidine nitrate, formanimide, formamidinesulfinic acid, formamidine acetate and mixtures thereof. For the optional removal of tantalum and tantalum nitride, the composition most advantageously includes 0.2 to 6 weight percent tantalum removal agent.

Optionally, the composition contains 0 to 25 weight percent oxidizer. The oxidizer is particularly effective in accelerating the removal rate of interconnect metals, such as copper. The oxidizing agent can be at least one of a number of oxidizing compounds, such as hydrogen peroxide ($H_2O_2$), monopersulfates, iodates, magnesium perphthalate, peracetic acid and other per-acids, persulfates, bromates, periodates, nitrates, iron salts, cerium salts, Mn (III), Mn (IV) and Mn (VI) salts, silver salts, Cu salts, chromium salts, cobalt salts, halogens hypochlorites and mixtures thereof. Furthermore, it is often advantageous to use a mixture of oxidizer compounds. The most advantageous oxidizers are hydrogen peroxide and iodate. When the polishing slurry contains an unstable oxidizing agent such as, hydrogen peroxide, it is often most advantageous to mix the oxidizer into the slurry at the point of use. Since this composition operates without an oxidizer, most advantageously, the composition contains no oxidizer to limit undesirable static etch of metal interconnects, such as, copper.

Typical silicon carbide nitride integration schemes require the removal of a barrier or capping layer with the simultaneous removal of a metal interconnect at a controlled rate. Suitable metals nonferrous metals used for the interconnect include, for example, copper, copper alloys, gold, gold alloys, nickel, nickel alloys, platinum group metals, platinum group metal alloys, silver, silver alloys, tungsten, tungsten alloys and mixtures comprising at least one of these metals. Advantageously, the interconnect metal is copper, a copper-base alloy, silver or a silver-base alloy. Most advantageously, the interconnect metal is copper.

Optionally, the solution may contain 0 to 15 weight percent inhibitor to control interconnect removal rate by static etch or other removal mechanism. Typically, adjusting the concentration of an inhibitor adjusts the interconnect metal removal rate by protecting the metal from static etch. Advantageously, the solution contains an optional 0 to 10 weight percent inhibitor. The inhibitor may consist of a mixture of inhibitors. Azole inhibitors are particularly effective for copper and silver interconnects. Typical azole inhibitors include benzotriazole (BTA), tolytriazole, imidazole and other azole compounds. Most advantageously, the slurry contains 0.001 to 5 weight percent total azole for inhibiting static etch of copper or silver interconnects. BTA is a particularly effective inhibitor for copper and silver.

In addition to the inhibitor, the solution optionally may contain 0 to 20 weight percent complexing agent for the nonferrous metal. The complexing agent, when present, prevents precipitation of the metal ions formed by dissolving the nonferrous metal interconnects. Most advantageously, the solution contains 0 to 10 weight percent complexing agent for the nonferrous interconnect metals. Example complexing agents include acetic acid, citric acid, ethyl acetoacetate, glycolic acid, lactic acid, malic acid, oxalic acid, saliclylic acid, sodium diethyl dithiocarbamate, succinic acid, tartaric acid, thioglycolic acid, glycine, alanine, aspartic acid, ethylene diamine, trimethyl diamine, malonic acid, gluteric acid, 3-hydroxybutyric acid, propionic acid, phthalic acid, isophthalic acid, 3-hydroxy salicylic acid, 3,5-dihydroxy salicylic acid, gallic acid, gluconic acid, pyrocatechol, pyrogallol, tannic acid, salts and mixtures thereof. Advantageously, the complexing agent is selected from the group consisting of acetic acid, citric acid, ethyl acetoacetate, glycolic acid, lactic acid, malic acid, oxalic acid and mixtures thereof. Most advantageously, the complexing agent is citric acid.

The polishing composition may optionally contain 0 to 30 weight percent abrasive to facilitate barrier layer removal or combined barrier layer and capping layer remova-depending upon the integration scheme, the polishing composition may serve to remove an upper cap layer or to first remove a barrier layer and then remove a cap layer. The polishing composition optionally includes the abrasive for "mechanical" removal of barrier layers. The abrasive is preferably a colloidal abrasive. Example abrasives include inorganic oxides, metal borides, metal carbides, metal nitrides, polymer particles and mixtures comprising at least one of the foregoing. Suitable inorganic oxides include, for example, silica ($SiO_2$), alumina ($Al_2O_3$), zirconia ($ZrO_2$), ceria ($CeO_2$), manganese oxide ($MnO_2$), or combinations comprising at least one of the foregoing oxides. Modified forms of these inorganic oxides, such as, polymer-coated inorganic oxide particles and inorganic coated particles may also be utilized if desired. Suitable metal carbides, boride and nitrides include, for example, silicon carbide, silicon nitride, silicon carbonitride (SiCN), boron carbide, tungsten carbide, zirconium carbide, aluminum boride, tantalum carbide, titanium carbide, or combinations comprising at least one of the foregoing metal carbides, boride and nitrides. Diamond may also be utilized as an abrasive if desired. Alternative abrasives also include polymeric particles and coated polymeric particles. The preferred abrasive is silica.

Advantageously, the abrasive is present in an amount of 0.05 to 15 wt % based on the total weight of the polishing composition. Within this range, it is desirable to have the abrasive present in an amount of greater than or equal to 0.1 wt %, and preferably greater than or equal to 0.5 wt %. Also desirable within this range is an amount of less than or equal to 10 wt %, and preferably less than or equal to 5 wt %.

The abrasive has an average particle size of less than or equal to 150 nanometers (nm) for preventing excessive metal dishing and dielectric erosion. For purposes of this specification, particle size refers to the average particle size of the abrasive. It is desirable to use a colloidal abrasive having an average particle size of less than or equal to 100 nm. The least dielectric erosion and metal dishing advantageously occurs with colloidal silica having an average particle size of less than or equal to 100 nm. Decreasing the size of the colloidal abrasive to less than or equal to 100 nm, tends to improve the selectivity of the polishing composition; but it also tends to decrease the barrier removal rate. In addition, the preferred colloidal abrasive may include additives, such as dispersants, surfactants and buffers to improve the stability of the colloidal abrasive at acidic pH ranges. One such colloidal abrasive is colloidal silica from Clariant S.A., of Puteaux, France. The chemical mechanical planarizing composition can also optionally include complexing agents, chelating agents, pH buffers, biocides and defoaming agents.

If the polishing composition does not contain abrasives, then pad selection and conditioning become more important to the chemical mechanical planarizing (CMP) process. For example, for some abrasive-free compositions, a fixed abrasive pad improves polishing performance.

The polishing solutions may also optionally include levelers such as, ammonium chloride, to control surface finish of the interconnect metal and biocides to limit biological activity within the composition.

The slurry can provide a TaN/SiCN, TEOS/SiCN, and SiN/SiCN selectivity of at least 2 to 1 as measured with a microporous polyurethane polishing pad pressure measured normal to a wafer of less than 13.8 kPa. A particular polishing pad useful for determining selectivity is the microporous polyurethane polishing pad, such as the IC 1000™ polishing pad sold by Rodel. Advantageously, the slurry provides the selectivity of at least 2 to 1 as measured with a microporous polyurethane polishing pad pressure measured normal to a wafer of less than 13.8 kPa; and most advantageously, this range is at least 5 to 1 for SiN/SiCN. And the slurry can provide tantalum nitride to silicon carbide nitride selectivity ratios in excess of 30 to 1. Adjusting the surfactant concentration, slurry pH, oxidizer concentration and tantalum removal agent concentrations adjust the selectivities. Adjusting the inhibitor, oxidizer, complexing agent adjusts the removal rate of the interconnect metals.

EXAMPLES

All the samples tested contain, by weight percent, 0.1% benzentriazole as the metal inhibitor, 12% silica with an average particle size of 50 nm, and 0.95% guanidine hydrochloride at a pH of 9. The experiment measured removal rates of TaN barrier, Ta barrier, silicon dioxide (TEOS), silicon nitride (SiN), silicon carbide nitride (SiCN), carbon doped oxide (CDO) and copper (Cu). In addition, Slurries A and B represent control slurries and enumerated Slurries 1 to 12 represent examples of the invention.

Example 1

In this test, the removal rates with addition of several alkanoamides are compared with control Slurry A. This test used a Strausbaugh polishing machine with an IC1010 polishing pad (Rodel, Inc.) under downforce conditions of about 2 psi (13.8 kPa) and a polishing slurry flow rate of 200 cc/min, a platen speed of 120 RPM and a carrier speed of 114 RPM polishing the sample wafers (200 mm). The polishing slurry had a pH of 9 adjusted with KOH or $HNO_3$ and all slurries were made with a balance of deionized water.

The following table indicates that alkanoamide surfactants have the ability to supress SiCN wafer removal rate while leaving the barrier and capping layer removal rates, including SiN, almost unaffected.

TABLE 1

| Slurry | Additive | Concentration (wt %) | TaN RR | TEOS RR | CDO RR | SiN RR | Ta RR | SiCN RR | Cu RR | Δ SiCN − Δ SiN | Ratio of SiN/SiCN |
|---|---|---|---|---|---|---|---|---|---|---|---|
| A | None | | 1564 | 855 | 2428 | 480 | 662 | 1304 | 63 | 0 | 0.37 |
| 1 | Cocamide DEA | 0.13 | 1466 | 732 | 139 | 399 | 620 | 87 | 108 | 1136 | 4.58 |
| 2 | Lauramide DEA | 0.13 | 1476 | 741 | 116 | 401 | 618 | 76 | 107 | 1149 | 5.26 |
| 3 | Linoleamide DEA | 0.13 | 1476 | 735 | 114 | 434 | 626 | 67 | 87 | 1191 | 6.48 |
| 4 | Ricinoleamide DEA | 0.13 | 1217 | 736 | 194 | 403 | 511 | 199 | 159 | 1028 | 2.02 |
| 5 | Incromide CA | 0.13 | 1626 | 679 | 103 | 370 | | 65 | 61 | 1129 | 5.69 |

RR = removal rate expressed in angstroms per minute
Δ SiCN − Δ SiN = [SiCN(without additive) − SiCN(with additive)] − [SiN(without additive) − SiN(with additive)]
Incromide CA is a C12 cocamide derived from coconut fatty acids and supplied by Croda Co.

The data of Table 1 indicate that with addition of 0.13 wt % of the alkanoamide surfactant the removal rate of silicon carbide nitride dropped from 1300 Å/min down to as low as 65 Å/min. In addition, the alkanoamide surfactants did not significantly decrease TaN, TEOS or SiN removal rates. The selectivity for SiN/SiCN increased from 0.37 to as high as 6.5. Furthermore, the selectivity of removal rate TaN to SiCN (or Ta/SiCN) and selectivity of removal TEOS to SiCN were much higher than the selectivity of SiN/SiCN.

Example 2

In this test, the removal rates with addition of several polyethylene oxide type surfactants were compared with a control using the conditions of Example 2.

The following Table indicates that the polyethylene oxide surfactants used also have the ability to effectively suppress only SiCN wafer removal rate while leaving barrier and capping layer removal rates almost unaffected.

TABLE 2

| Slurry | Additive | Concentration (wt %) | TaN RR | TEOS RR | CDO RR | SiCN RR | Cu RR | SiN RR | Ta RR | Ratio of SiN/SiCN | Ratio of TaN/CDO | Δ SiCN − Δ SiN | HLB |
|---|---|---|---|---|---|---|---|---|---|---|---|---|---|
| B | None | | 1665 | 721 | 2175 | 1213 | 78 | 487 | 668 | 0.40 | 0.8 | 0 | |
| 6 | $C_{18}(EO)_{20}OH$ | 0.03% | 1683 | 462 | 26 | 117 | 30 | 326 | 582 | 2.80 | 64.2 | 936 | 15.3 |
| 7 | $C_{12}(EO)_{4}OH$ | 0.03% | 1507 | 764 | 110 | 127 | 9 | 431 | 539 | 3.41 | 13.7 | 1031 | 9.1 |
| 8 | $C_{16}(EO)_{10}OH$ | 0.03% | 1681 | 515 | 22 | 108 | 0 | 353 | 616 | 3.27 | 78.0 | 971 | 12.9 |
| 9 | $C_{18}(EO)_{10}OH$ | 0.03% | 1557 | 629 | 28 | 64 | 52 | 355 | 526 | 5.54 | 55.2 | 1017 | 12.4 |
| 10 | $C_{18}(EO)_{10}OH$ | 0.10% | 1456 | 464 | 27 | 47 | 33 | 265 | 496 | 5.60 | 54.1 | 944 | 12.4 |
| 11 | $C_{8}(C_{6}H_{4})(EO)_{10}OH$ | 0.10% | 1640 | 528 | 42 | 125 | 84 | 340 | 610 | 2.72 | 38.7 | 941 | 10.4 |
| 12 | $C_{8}(C_{6}H_{4})(EO)_{35}OH$ | 0.10% | 1672 | 547 | 32 | 73 | 94 | 359 | 697 | 4.88 | 52.3 | 1011 | 17.9 |

RR = removal rate expressed in angstroms per minute.
Δ SiCN − Δ SiN = [SiCN(without additive) − SiCN(with additive)] − [SiN(without additive) − SiN(with additive)].
For $C_m(EO)_nOH$, m equals carbon atoms and n equals the number of polymerized (ethylene oxide) groups.
For $C_8(C_6H_4)(EO)_nOH$, the hydrophobic group contains an octylphenol and n equals the number of polymerized (ethylene oxide) groups.
$C_{18}(EO)_{20}OH$ was Brij-98 supplied by Aldrich Corp.
$C_{12}(EO)_{4}OH$ was Brij-30 supplied by Aldrich Corp.
$C_{16}(EO)_{10}OH$ was Brij-56 supplied by Aldrich Corp.
$C_{18}(EO)_{10}OH$ was Brij-97 supplied by Aldrich Corp.
$C_8(C_6H_4)(EO)_{10}OH$ was Triton X 100 supplied by Aldrich Corp.
$C_8(C_6H_4)(EO)_{35}OH$ was Triton X 405 supplied by Aldrich Corp.

The polyethylene oxide surfactants suppressed the silicon carbide nitride removal rate from about 1200 Å/min to as low as 64 Å/min, while the removal rates of TaN, TEOS and SiN only slightly changed. The SiN/SiCN removal rate ratio (selectivity) increased from 0.4 to as high as 5.5. Furthermore, selectivity of removal rate for TaN to SiCN (or Ta/SiCN) and TEOS to SiCN was much higher than the selectivity of SiN/SiCN.

The addition of nonionic surfactants has almost no effect on the removal rates of tantalum material, silicon nitride and silicon dioxide. But the nonionic surfactant can effectively reduce the removal rate of silicon carbide nitride from more than two thousand angstroms per minute to an acceptable level for stopping at the silicon carbide nitride layer. In addition, the solution and method optionally provide excellent selectivity for removing tantalum barrier materials such as tantalum, tantalum nitride and tantalum oxide and capping layers such as, silicon nitride and silicon oxide while stopping at the silicon carbide nitride layer. In addition, the solution selectively removes barrier layers, capping layers, dielectric layers, anti-reflective layers and hard masks while stopping at the silicon carbide nitride to protect underlying dielectrics and reduce or eliminate dielectric erosion. In addition, the composition includes the benefit of functioning to stop on either a silicon carbide nitride layer or a CDO layer. This allows a single slurry to serve multiple functions within a single integration scheme.

We claim:

1. A polishing method for removing at least one coating layer from a semiconductor substrate, the semiconductor substrate including silicon nitride, silicon carbide nitride and a dielectric comprising the step of polishing with an aqueous composition, the aqueous composition comprising a nonionic surfactant that suppresses removal rate of silicon carbide-nitride, the nonionic surfactant having a hydrophilic group and a hydrophobic group, the hydrophobic group having a carbon chain length of greater than three, the nonionic surfactant being selected from the group comprising alkanoamide, alkyl polyethylene oxide, alkylphenol polyethylene oxide and a mixture thereof for removing silicon nitride and stopping on a silicon carbide-nitride layer and the nonionic surfactant suppresses silicon carbide-nitride removal rate at least 100 angstroms per minute greater than its decrease in silicon nitride removal rate as measured with a microporous polyurethane polishing pad pressure measured normal to a wafer of 13.8 kPa.

2. The method of claim 1 wherein the nonionic surfactant is selected from the group comprising alkanoamide, alkyl polyethylene oxide, alkylphenol polyethylene oxide, polyoxyethylenated alkyl amine oxide, polyoxyethylenated polyoxypropylene glycols, alkyl polyglucoside, alkyl carboxylic acid esters, polyoxyethylenated mercaptans, alkyl diglyceride, polyoxyethylenated alkanolamine, polyalkoxylated amides, tertiary acetylenic glycols and a mixture thereof.

3. The method of claim 1 wherein the aqueous composition contains 0 to 30 abrasive, 0 to 15 inhibitor for a nonferrous metal, 0 to 25 oxidizer, 0 to 10 tantalum removal agent selected from the group comprising formamidine, formamidine salts, formamidine derivatives, guanidine derivatives, guanidine salts and mixtures thereof and 0.001 to 5 nonionic surfactant.

4. The method of claim 1 wherein the polishing occurs in the presence of a carbon-doped oxide.

5. The method of claim 1 wherein the nonionic surfactant is an alkanoamide and the alkanoamide is an acylation product of alkanolamines from the group comprising monoalkanolamine (MAA), dialkanolamine (DAA), trialkanolamine and a mixture thereof.

6. The method of claim 1 wherein the nonionic surfactant is an alkanolamine selected from the group comprising diethanolamine, monoethanolamine, triethanolamine, diisopropanolamine, monoisopropanolamine, ethanoisopropanolamine and a mixture thereof; and the hydrophobic group has a carbon chain length of at least six carbon atoms.

7. The method of claim 1 wherein the tantalum removal agent is selected from the group comprising guanidine hydrochloride, guanidine sulfate, amino-guanidine hydrochloride, guanidine acetic acid, guanidine carbonate, guanidine nitrate, formanimide, formamidinesulfinic acid and a mixture thereof, and the tantalum removal agent is 0.2 to 6 weight percent.

8. The method of claim 1 including the step of stopping the polishing before removing all of the silicon carbide-nitride layer.

9. The method of claim 1 wherein the polishing stops on a carbon doped oxide layer.

10. The method of claim 1 wherein the aqueous composition has a pH of 7 to 10.

* * * * *